Figure 3:
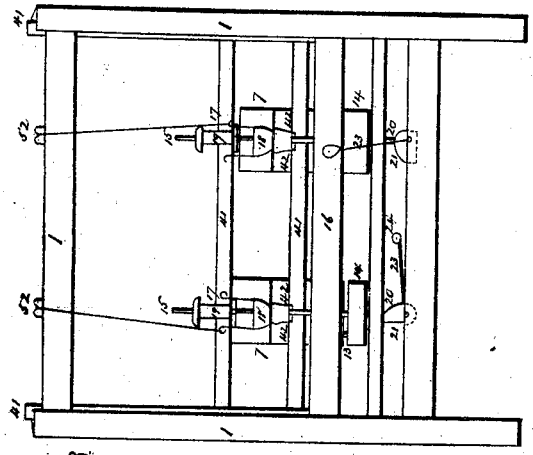

H. Holland.

Spinning Silk.

Nº 977. Patented Oct. 10, 1838.

UNITED STATES PATENT OFFICE.

HARRISON HOLLAND, OF NORTHAMPTON, MASSACHUSETTS.

SILK-SPINNER.

Specification of Letters Patent No. 977, dated October 10, 1838.

*To all whom it may concern:*

Figure 4:
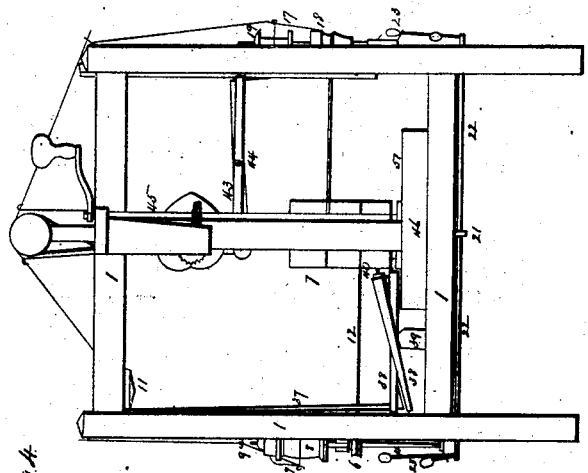
Figure 2:
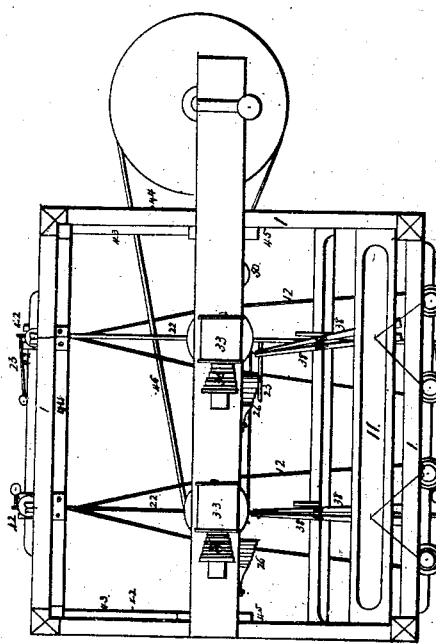
Figure 1:
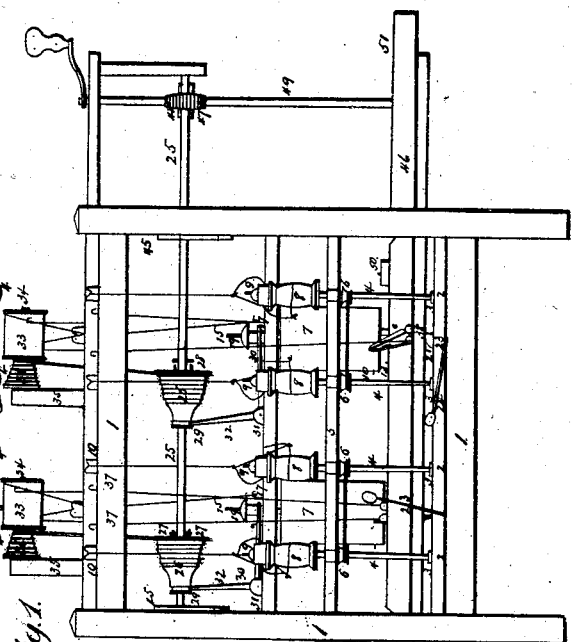

Be it known that I, HARRISON HOLLAND, of Northampton, in the county of Hampshire and Commonwealth of Massachusetts, machinist, and a native-born citizen of the United States, have invented, made, and applied to use a certain machine or improvement in the spinning, doubling, and twisting of silk, to be performed by one operation, which I have denominated Holland's Improved Silk-Spinner, of which the following, with the drawing annexed, is a full description of said machine and its several parts, with the mode of operation thereof, viz:

This invention, or improvement consists of a quadrangular frame 1, 1, 1, 1, of any required dimensions, to support the machinery. On the upper surface of the lower girt of the frame Q are placed at proper distances, any required number of sockets 3, for spindles 4, to run in and which are placed perpendicularly and passing through a second girt 5, in the frame directly above the first mentioned and by which they are sustained in their places. These spindles have each a whirl 6, on them between the girts and by which they are connected with a drum 7, hereinafter mentioned. On these spindles are placed the bobbins 8, of raw silk to be spun, doubled, and twisted having above them on the spindles a common, or flier 9, to twist and carry the silk from the bobbins. On the upper side of the upper front girt of the frame, are a number of bent wires 10, corresponding with the number of the spindles underneath them and over which wires, the silk from the bobbins beneath them is conducted. Directly in the rear of these bent wires is a trough 11, to be filled with water, or other liquid, having hooks in the bottom of it, through each of which two or more threads from the bobbin 8, are made to meet, and pass in the water. In the rear of, and between each two of the front spindles, is a drum 7, placed vertically, and moving horizontally, and which is connected with them by a band or cord 12, passing around the drum and spindles. Each drum has a dog 13, in its lower head, which drops into a corresponding socket, in a banded pulley 14, when in gear and which connects with the moving power. On the rear bottom girt are placed vertically any required number of dead or standing spindles 15, passing through a second girt above it 16, for support and on which are placed fliers 17, with whirls on the bottom 18, and by which they are connected by cords or bands with the vertical drum 7, before mentioned. On these spindles and above the fliers are placed bobbins 19, to receive the silk after it is doubled, and twisted from the front spindles 4. Underneath the lower gudgeon of each drum 20, Fig. 3, and upon which it rests is a cam 21, affixed to the horizontal rod 22, Fig. 4, the rod passing through it at right angles and leaving about three fourths of the diameter upon one side. On this cam-rod are three upright standards 23, Fig. 2, one at each end and one a little in front of the drum 7, the rod running horizontally from front to rear of the machine. The two end standards 23, are loaded at the top end the rod is so balanced that when they are a little inclined upon one side the weight will throw the standards into a horizontal position 24, Fig. 3, by which the cam on the rod 21, pressing on the bottom of the gudgeon of the drum 7, throws it up, and frees the dog 13, in the bottom of the drum from its socket in the pulley 14, below and the drum stops. Above the drum 7, and parallel with the lines of spindles and about equidistant from them is a horizontal shaft 25, Fig. 1, supported by uprights in the frame. On this shaft are as many whirls 26, in the form of a truncated cone as there are drums 7, and running loosely on the shaft. These whirls are grooved crosswise, and have in the larger end two pins to interlock with a pin through the shaft 28. At the other end is a spiral spring, 29, on the shaft, pressing against the whirl 26, or the same may be effected by a groove in the whirl to keep it interlocked except when it is thrown out of gear as is hereinafter described. On the top gudgeon of each drum is an L 30, having its extreme horizontal line resting on the top of the gudgeon of the drum 7, or running in a groove in the gudgeon, and is movable on a pin through it at the angle 31, and having the upper end of the perpendicular line 32, running in a groove on the whirl 26, on the horizontal shaft 25, above it and when the drum 7, is thrown out of gear by the cam 21, Fig. 3, under its lower gudgeon the same operating by means of the L 30, throws the whirl 26 on the horizontal shaft 25, out of gear, and it stops. Directly over each drum 7, and over the horizontal shaft 25, is a short cylinder 33, Fig. 1, moving on a horizontal axis 34, affixed to an upright 35, and having on the end of the cylinder next the upright or support a whirl 36, in the form of a truncated cone and is grooved crosswise, and standing in opposition to the whirl 26 on the horizontal shaft 25, beneath it and with which it is connected by a band or cord the speed of the cylinder being regulated by the form of the whirl. On each thread (passing off the first spindles 4,) and between the bent wires 10, on the top of the machine and the trough, 11, are hung small rods perpendicularly 37, Fig. 4, having their lower ends connected with a short horizontal lever, 38, which comes nearly in contact with the periphery of the drum 7, behind it. These levers are very nearly balanced on a fulcrum 39, and on the drum a little above them is a pin 40, of sufficient length to throw the levers 38, one side if they come in contact. On the rear posts of the frame is affixed a movable upright frame 41, like a sawgate, having arms 42, Figs 2, 3, extending from it to each of the rear spindles 15, to regulate the winding of the silk on the bobbins of these spindles. A horizontal lever 43, or levers supported on a fulcrum 44, extends from this movable frame 41, to the horizontal shaft 25, on which is a heart 45, Fig. 4, which by its revolutions moves the levers 43, and with them the movable frame 41, under the whirls on the rear spindles 15, up and down to regulate the winding the silk on the bobbins. The drums 7 are moved by a band 46, around the pulleys 14, below them and connected with the moving power. The horizontal shaft 25, is moved by a cog-wheel—47, upon it geared into an endless screw 48, on a vertical shaft 49. Each two front spindles 4, are banded upon their corresponding drums 7. And each rear spindle 15, is crossbanded upon the same drum 7. The short cylinders 33, on the top of the machine are banded upon the corresponding whirls 26, on the horizontal shaft 25. Between each two pulleys 14, under the drums 7, must be placed a friction roller 50, to hold the band inward upon them. Banded wheel 51, on a vertical shaft connected with the pulleys under the drums by a band or cord.

On the rear, top-girt are placed bent wires 52, over which the threads pass from the cylinder 33, upon the spindles 15.

*Mode of operation.*—The raw silk wound on bobbins, is placed on the front spindles, 4, and passed through the fliers 9, and up, and over the bent wires, 10, on the top girt of the frame, thence through the hooks in the bottom of the trough, 11, where the threads are doubled, and from thence under, and once around the short cylinder, 33, and over bent wires on the rear top girt of the frame 50, from thence it is twisted and spun upon the rear spindles 15. Should any thread break while the machine is in operation, the small perpendicular rod 37, having upon it, would drop, and the extreme end of the lever 38, to which it is attached would be raised and come in contact with the pin or cog 40, on the periphery of the drum 7, which throws it aside and against the center standard on the cam-rod 22, the balance of which being destroyed, the standards 23, fall into a horizontal position 24, and the cam throws the drum out of gear, and it stops, the same operation by raising the drum 7, moves the L 30, by which the whirl 26, in the horizontal shaft 25, is thrown out of gear, when all the spindles connected with that drum and the corresponding short cylinder 33, will stop.

What I claim as my invention and desire to secure by Letters Patent is—

The method of stopping the machine when a thread breaks by means of drop rods which throw the drums and whirls out of gear in the manner herein described, and also the method of changing the twist by means of the short cylinders in the manner herein before described.

In testimony that the foregoing is a full and exact description of my said improvement and invention I the said HARRISON HOLLAND have hereunto set my hand at Northampton aforesaid this twenty ninth day of March in the year of our Lord one thousand eight hundred and thirty seven.

HARRISON HOLLAND. [L. S.]

Witnesses:
ELVIN BERNARD,
SAMUEL WELLS.